R. HILDEBRAND.
CONTROLLING MECHANISM FOR INTERNAL COMBUSTION ENGINES.
APPLICATION FILED JUNE 23, 1919.
1,376,619. Patented May 3, 1921.
6 SHEETS—SHEET 3.
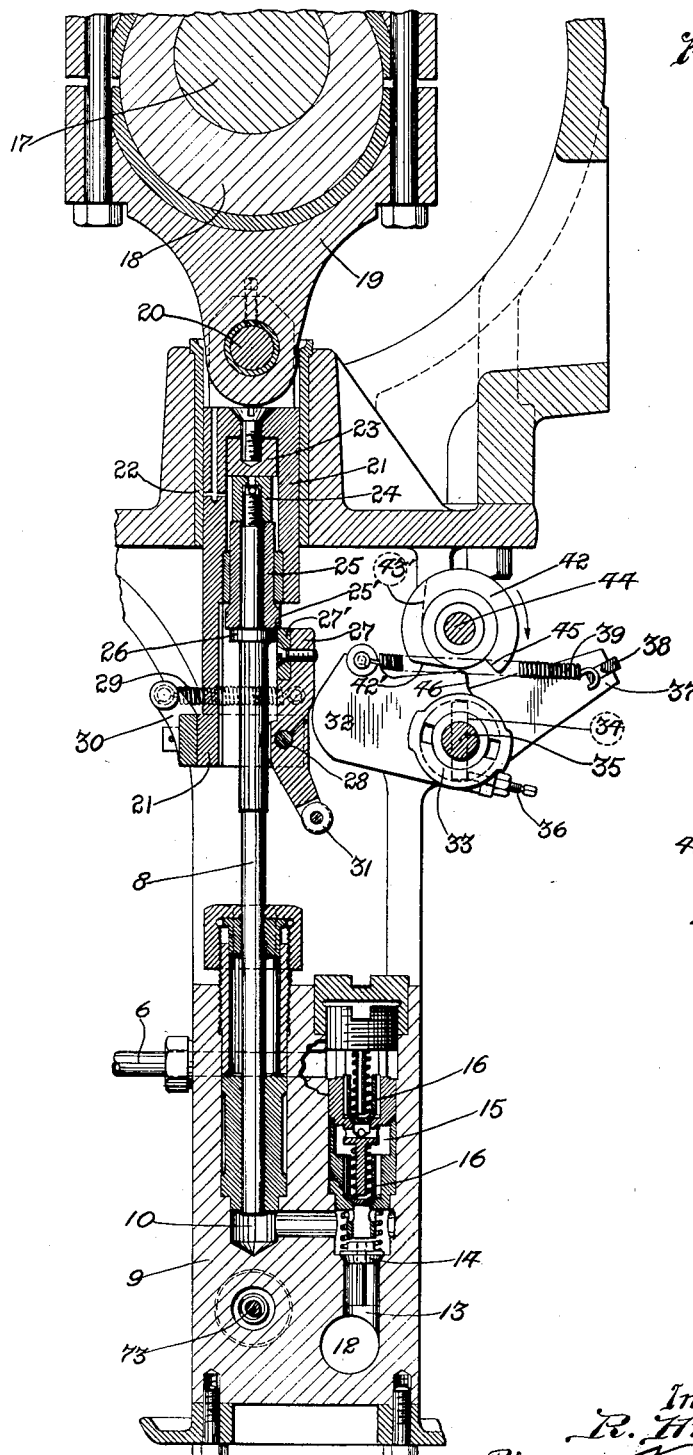
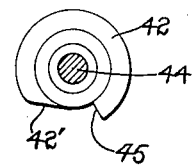
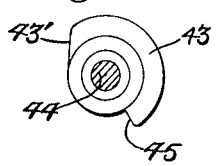
Inventor:
R. Hildebrand,
By
his Attorneys.

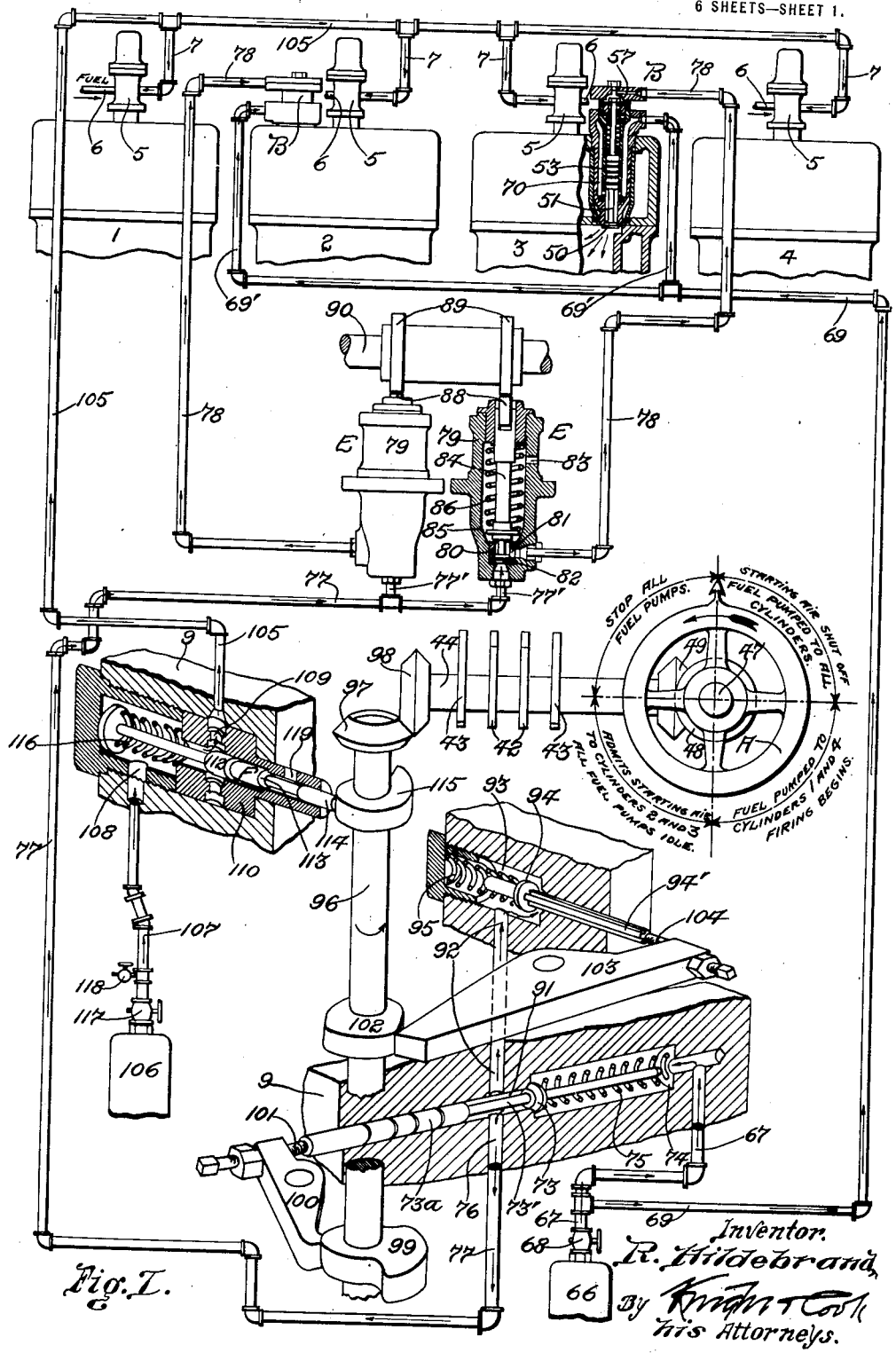
Fig. I.

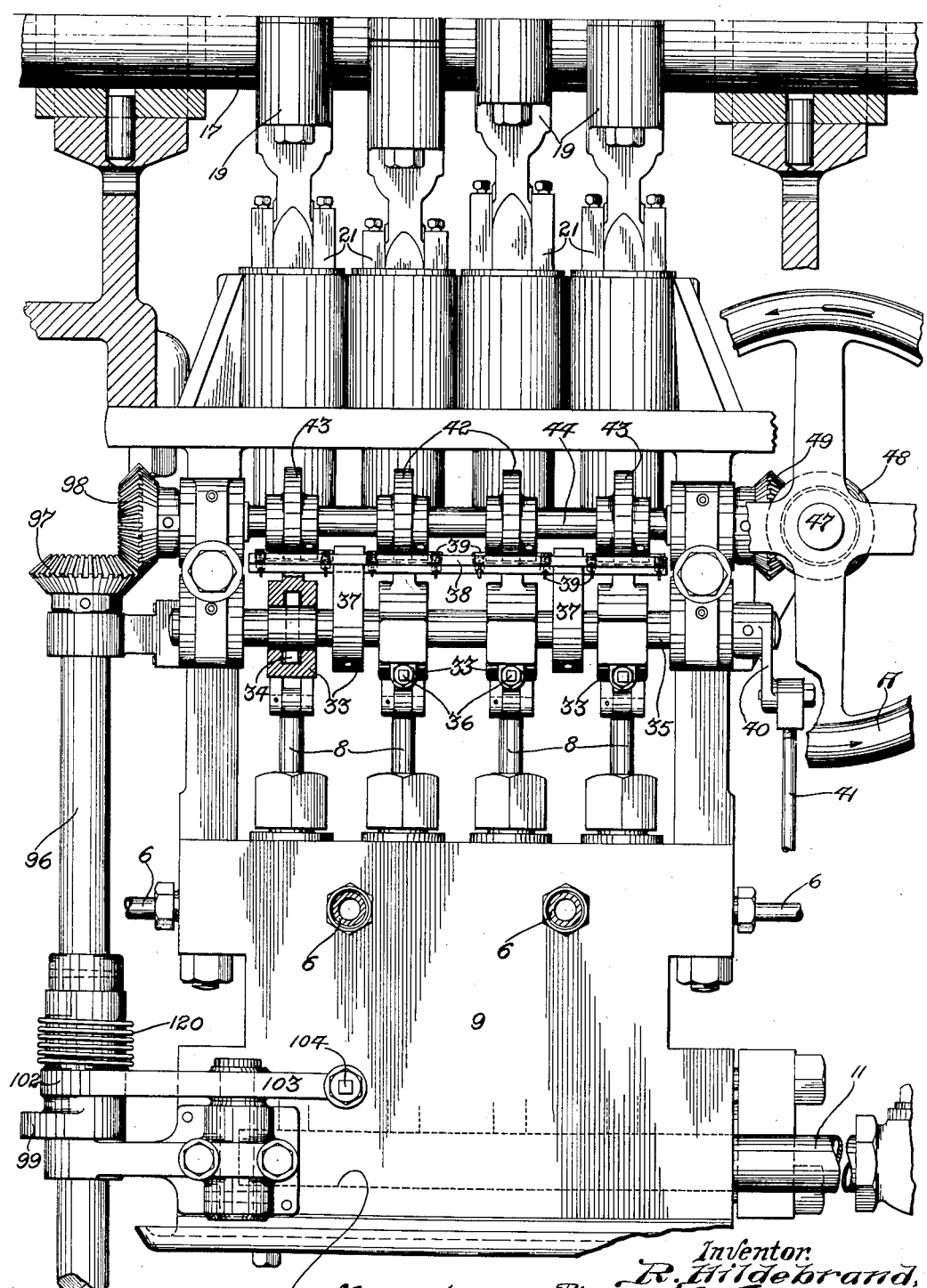

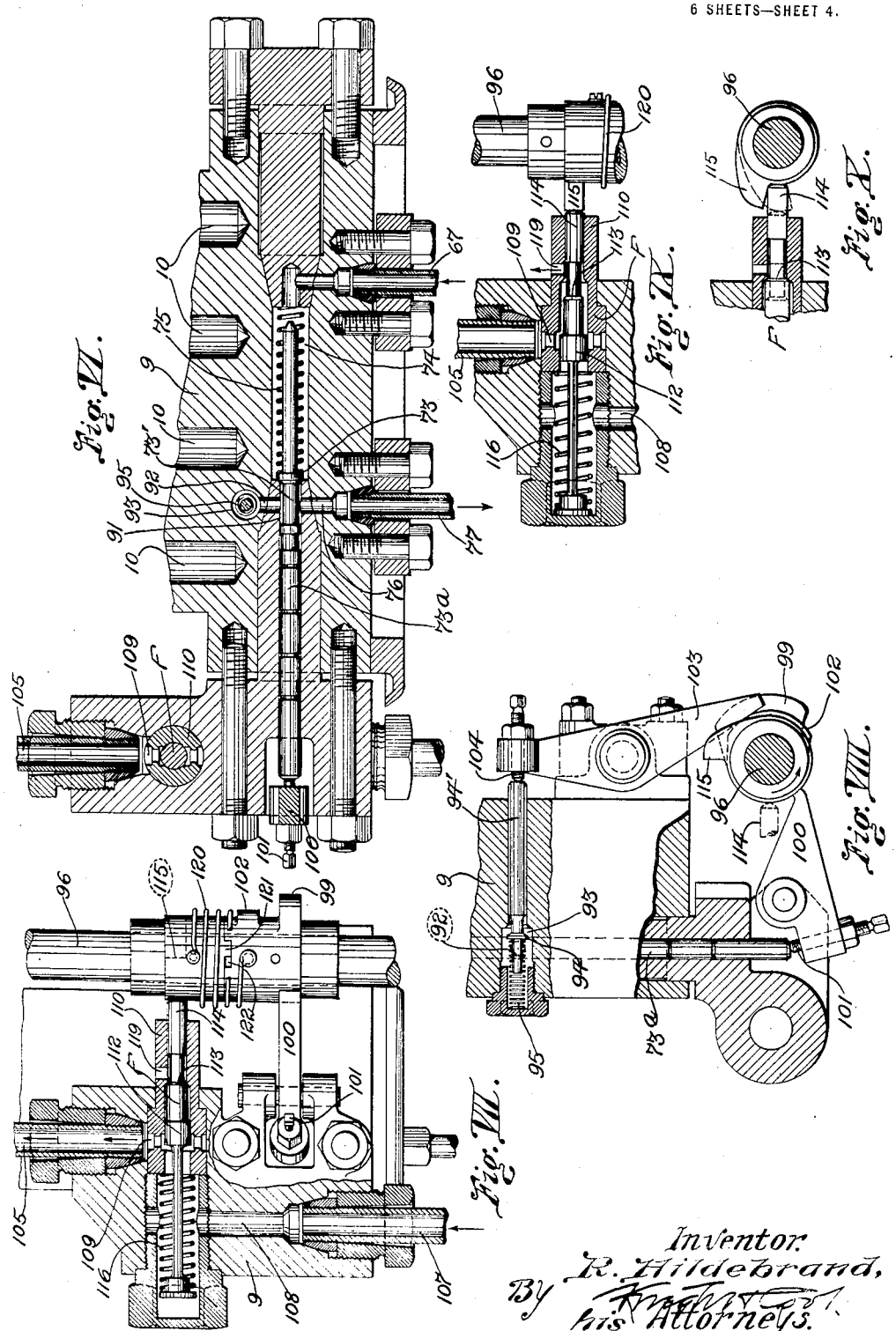

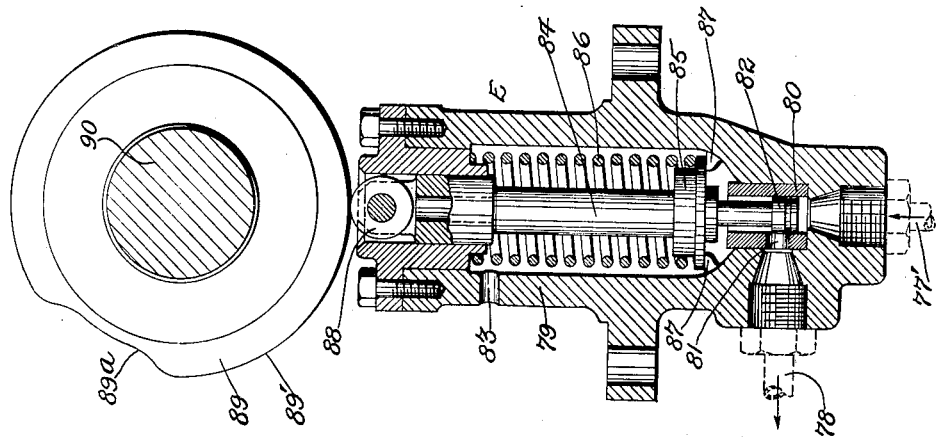
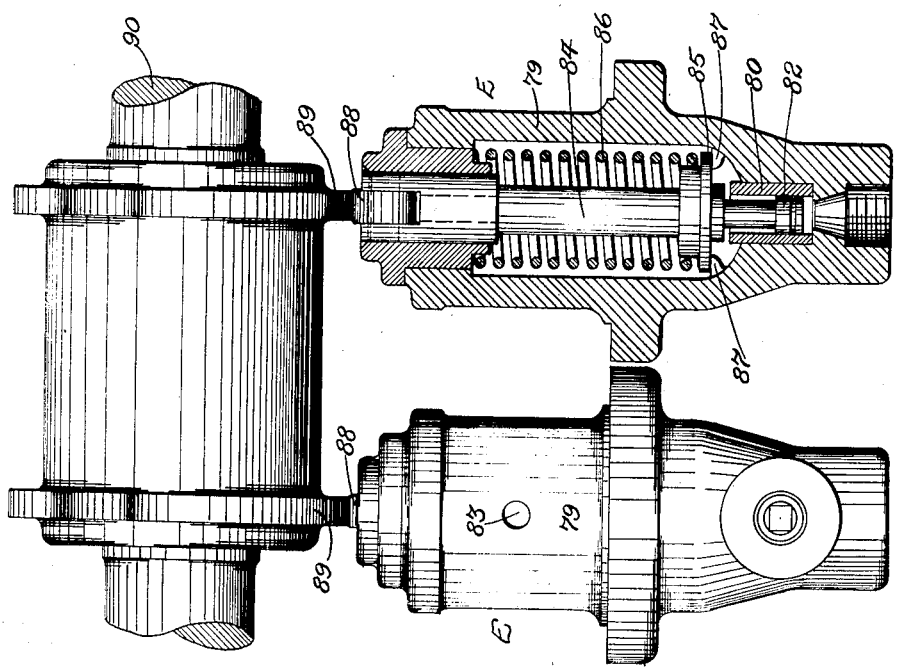

R. HILDEBRAND.
CONTROLLING MECHANISM FOR INTERNAL COMBUSTION ENGINES.
APPLICATION FILED JUNE 23, 1919.
1,376,619.
Patented May 3, 1921.
6 SHEETS—SHEET 6.
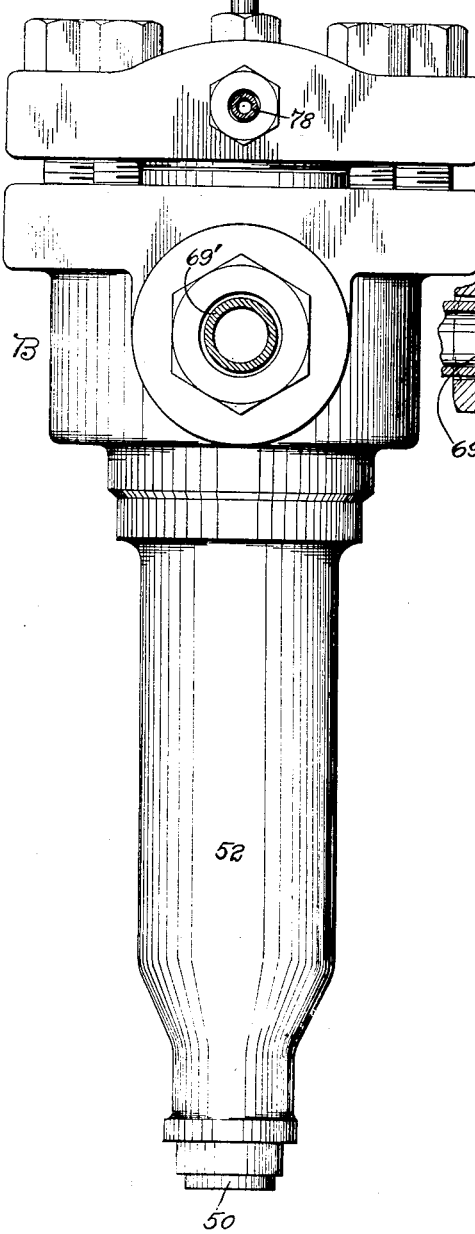
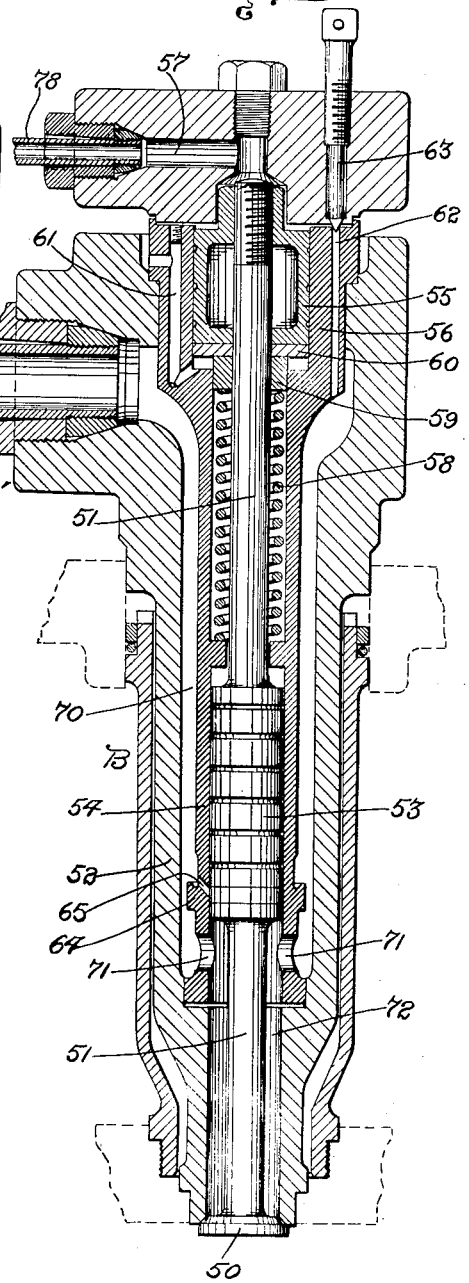
Inventor:
R. Hildebrand,
By Knight & Cook
his Attorneys.

UNITED STATES PATENT OFFICE.

REINHARD HILDEBRAND, OF WEBSTER GROVES, MISSOURI, ASSIGNOR TO FULTON IRON WORKS COMPANY, OF ST. LOUIS, MISSOURI, A CORPORATION OF DELAWARE.

CONTROLLING MECHANISM FOR INTERNAL-COMBUSTION ENGINES.

1,376,619.  Specification of Letters Patent.  Patented May 3, 1921.

Application filed June 23, 1919. Serial No. 306,179.

*To all whom it may concern:*

Be it known that I, REINHARD HILDEBRAND, a citizen of Germany, a resident of Webster Groves, in the county of St. Louis and State of Missouri, have invented certain new and useful Improvements in Controlling Mechanisms for Internal-Combustion Engines, of which the following is a full, clear, and exact description, reference being had to the accompanying drawings, forming a part of this specification.

My invention relates to improvements in controlling mechanism for internal combustion engines of the type wherein air is compressed to a temperature high enough to ignite the fuel. The main object of the invention is to provide a simple and reliable starting mechanism which may be very easily controlled by the operator, so as to effectively perform the various operations necessary for the starting and stopping of the engine.

Engines of this type, ordinarily known as Diesel engines, usually include fuel pumps whereby liquid fuel is pumped to injection valves on the several engine cylinders, and compressed air under a high pressure is usually employed to inject the fuel from said valves and into the cylinders. In starting the engine, it is customary to introduce compressed air into one or more of the cylinders and to operate the engine for a brief period by the energy derived from the air pressure, without forcing fuel into any of the cylinders. After starting the engine in this manner, fuel is forced into the cylinders and the engine is then driven by the expansive force resulting from the combustion of fuel, instead of by the compressed air. To stop the engine, it is only necessary to prevent effective operation of the fuel pumps.

One of the objects of the invention is to safely and easily control the fuel pumps, as well as the various valves for the compressed air used in starting the engine. Another object is to control the injection air so as to prevent this air from prematurely starting the engine. A further object is to provide an improved means for actuating the inlet valves through which the starting air is admitted to the cylinders.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a diagrammatical view illustrating a controlling mechanism constructed in accordance with this invention.

Fig. II is a front elevation showing the fuel pumps and the hand operated controlling shafts.

Fig. III is a vertical section illustrating one of the fuel pumps.

Fig. IV is a detail view of one of the pump controlling cams.

Fig. V is a detail view of another pump controlling cam.

Fig. VI is a horizontal section showing a valve for controlling the starting air.

Fig. VII is a vertical section, partly in elevation, showing a portion of a manually operated controlling shaft, and also showing a valve device through which the injection air passes.

Fig. VIII is a horizontal section, partly in elevation, illustrating the starting air valve shown in Fig. VI, and also showing the vent valve which lies above the starting air valve.

Fig. IX is a fragmentary view showing the injection air valve in its closed position.

Fig. X is a horizontal section, showing the cam whereby the injection air valve may be retained in its closed position.

Fig. XI is an enlarged detail view, showing the distributing valves which control the movements of the air actuated inlet valves.

Fig. XII is a vertical section taken approximately through the center of one of the valves shown in Fig. XI.

Fig. XIII is an enlarged detail view of the exterior of one of the air actuated valve devices through which the starting air is admitted to the cylinders.

Fig. XIV is a vertical section of the valve device shown in Fig. XIII.

Before describing the various details of construction, I will briefly outline the operations of the general combination of elements which I have shown to illustrate the preferred form of the invention.

The controlling mechanism about to be described comprises a plurality of fuel pumps, one for each cylinder, whereby fuel is pumped to injection valves which receive air under high pressure for the injection of fuel into the cylinders, and these fuel pumps as well as various elements of the starting mechanism are under the control of a primary operating member, such as a single hand wheel or lever, which may be moved by the operator to stop the engine, or to perform the successive operations necessary for starting the engine. Under normal operating conditions, all of the fuel pumps are operated to deliver fuel to all of the injection valves, and these valves may be automatically operated by any suitable mechanism to permit the injection air to force the fuel into the engine cylinders. At this time an open valve permits injection air to pass freely to all of the cylinders, and the starting air is prevented from passing to the cylinders. To stop the engine it is only necessary to turn the primary controlling member (hand wheel) one-fourth of a revolution, thereby stopping all of the fuel pumps. In starting the engine, the hand wheel is turned another one-fourth of a revolution, with the result of admitting starting air to one or more of the cylinders, while all of the fuel pumps are idle. Another one-fourth of a revolution of the hand wheel will result in a continued delivery of starting air to the last mentioned cylinders, and also in the operation of one or more fuel pumps which deliver fuel to one or more of the other cylinders. The engine is then operated for a brief period, partly by compressed air in one or more of the cylinders and partly by the combustion of fuel in the other cylinder or cylinders; whereupon, the hand wheel is turned another one-fourth of a revolution so as to shut off the starting air and to connect the idle fuel pumps to their operating mechanism. This establishes normal operating conditions, fuel being pumped to all of the injection valves.

1, 2, 3 and 4 (Fig. I) designates the cylinders of an internal combustion engine, each cylinder having an ordinary injection valve 5 for the admission of liquid fuel. 6 designates oil conducting pipes whereby the liquid fuel is delivered to the injection valves, and 7 designates branch pipes through which the injection air under a high pressure is delivered to said valves, for the purpose of injecting the liquid fuel into the cylinders. The injection valves may be operated in the usual manner, so as to admit the fuel during predetermined periods in the cycle of operations, and it is not necessary to interrupt the operation of these valves in starting the engine. I have not shown the means for operating these valves, and I have also omitted the ordinary air inlet and exhaust valves, as well as their operating mechanism, for these elements are old and well known in the art, and it is not necessary to depart from their usual construction in utilizing the present invention.

To supply liquid fuel to the engine, the mechanism herein shown (Figs. II and III) includes four fuel pumps, one for each cylinder, and each fuel pump is provided with a plunger 8 adapted to reciprocate in a block 9, the latter being bored to form pump cylinders 10 (Figs. III and VI). The liquid fuel is conducted through an inlet pipe 11 (Figs. II) and into an inlet manifold 12 (Figs. II and III) formed in the block 9. Each fuel pump is provided with an inlet port 13 (Fig. III) adapted to be closed by a spring pressed inlet valve 14, and each pump also has a discharge passageway 15 adapted to be closed by spring pressed valves 16. When a pump plunger 8 moves upwardly, liquid fuel is drawn from the inlet manifold 12 and through an inlet port 13, the inlet valve 14 associated with the rising pump plunger being free to open in response to the movement of the incoming liquid. During the downward stroke of a pump plunger 8, liquid fuel is displaced and discharged through a passageway 15 (Fig. III) containing the spring actuated check valves 16 which permit the outgoing liquid to flow into one of the discharge pipes 6. It is to be understood that the block 9, in which the pump plungers reciprocate, is provided with a discharge pipe 6 for each pump, and that these pipes 6 may lead to the injection valves 5 shown in Fig. I.

The means for operating the pump plungers 8 includes a rotary shaft 17 (Figs. II and III), provided with eccentrics 18 surrounded by eccentric straps 19, the lower end of each strap being pivoted at 20 to the upper end of a tubular driver 21. Each tubular driver 21 is movable vertically in a guide 22. To transmit downward movement to a pump plunger, each tubular driver 21 is provided with a striking block 23 (Fig. III) adapted to engage an abutment 24 screwed onto the upper end of a plunger 8. Each plunger 8 also carries a sleeve 25 (Fig. III) confined between abutment 24 and a collar 26, the lower end of sleeve 25 being larger than the diameter of collar 26, so as to provide an abutment shoulder 25'. The operating mechanism of each fuel pump includes a trippable connecting member 27, pivoted at 28 to the lower end of a tubular driver 21, and provided with an abutment block 27' adapted to engage the abutment shoulder 25' at the lower end of sleeve 25. Each connecting member 27, in addition to being pivoted to a tubular driver 21, is yieldingly connected to said driver by means of a spring 29 attached to an arm 30 on the rear of the driver, and this spring tends to retain the connecting member in the position shown in Fig. III, wherein its abutment 27' engages the lower end of sleeve 25.

When an eccentric strap 19 moves downwardly, it imparts a downward movement to one of the tubular drivers 21, and motion is thus transmitted from the striking block 23 (Fig. III) to the abutment 24 on the upper end of pump plunger 8, so as to positively impart a downward movement to the pump plunger. During the return stroke, when the driver 21 moves upwardly, motion is transmitted from said driver, through the pivot 28 and connecting member 27, to the abutment 27' which engages the lower end of sleeve 25 so as to impart an upward movement to the pump plunger. A fixed reciprocating movement is transmitted to the driver 21, but the stroke of the pump plunger may be varied by disconnecting said plunger from the driver before the latter completes its upward movement. This may be accomplished by operating the connecting member 27 so as to disengage its abutment 27' from the sleeve 25 during the upward stroke of the driver, as will be presently described.

Each connecting member 27 is in the form of a lever, fulcrumed at 28 and provided at its lower end with a roller 31 adapted to engage a cam 32, for the purpose of displacing the abutment 27' from the lower end of sleeve 25, thereby permitting the tubular driver 21 to rise independently of the pump plunger. Each cam 32 has a hollow hub 33 (Figs. II and III) adapted to receive a pin 34 projecting from a shaft 35, and each hollow hub 33 is provided with an abutment screw 36 adapted to engage the pin 34. The hubs 33 are loosely mounted on the shaft 35. 37 designates arms (Figs. II and III) fixed to the shaft 35, and 38 is a spring holding bar secured to these arms. Springs 39, yieldingly connecting the cams 32 to the bar 38, tend to move the cams 32 relative to the shaft 35, but such movement is normally prevented by the abutment screws 36 which engage the pins 34. It will be observed, however, that a cam 32, loosely mounted on shaft 35, could be forced downwardly from the positions shown in Fig. III without transmitting movement to the shaft 35, the abutment screw 36 being free to move away from pin 34 in response to a downward movement of cam 32. Under normal conditions the springs 39 retain the abutment screws 36 in engagement with pins 34, and the cams 32 will therefore turn in either direction with the shaft 35. This shaft has an operating arm 40 (Fig. II) at one of its ends, adapted to be driven by a connecting member 41, which may be operated by hand or by the engine governor (not shown).

It will now be understood that the shaft 35 may be adjusted for the purpose of adjusting the cams 32, and that such adjustments will vary the strokes of the pump plungers 8. To shorten the strokes of the pump plungers, the cams 32 are adjusted downwardly, and to lengthen the strokes they are moved upwardly, it being understood that the rollers 31 engage said cams for the purpose of disconnecting the driver 21 from the pump plungers during the upward strokes of the driver, and that the length of the plunger strokes will depend upon the time at which the driver is disconnected from the plunger.

To stop the engine, it is necessary to discontinue the delivery of fuel to the engine cylinders, and this may be accomplished by preventing the transmission of movement from the reciprocating drivers 21 to the pump plungers 8. It is therefore important to observe that the cams 32 can be moved downwardly to extreme positions wherein they will coöperate with rollers 31, so as to retain the trippable connecting devices 27 in inoperative positions, wherein their abutment blocks 27' will be disengaged from the shoulders 25' at the lower ends of sleeves 25. In this event the drivers 21 will be permitted to reciprocate without transmitting movement to the plungers 8. I have previously shown that the cams 32 may be adjusted independently of the shaft 35 on which they are loosely mounted, and by an adjustment of this kind they can be moved to their lowermost positions wherein they will retain the connecting devices 27 in inoperative positions. To accomplish this, pump controlling cams 42 and 43 are fixed to a shaft 44 (Figs. II, III, IV and V), each of said cams having a shoulder 45 adapted to coöperate with a shoulder 46 on a cam 32, with the result of moving said cam 32 to its lowermost position. If the shaft 44 is turned one-fourth of a revolution from the normal position (shown in Fig. III), all of the shoulders 45 will engage the shoulders 46 on cams 32, and upon the completion of this movement, the peripheral faces of cams 42 and 43 will engage the shoulders 46 so as to locate the cams 32 in their lowermost positions. Therefore, if the shaft 44 is turned one-fourth of a revolution from the normal position shown in Fig. III, the cams 32 will coöperate with the connecting devices 27 so as to prevent the transmission of movement from the reciprocating driver 21 to the pump plungers 8, and if this is done while the engine is in operation the delivery of fuel to the engine cylinders will be stopped, with the result of stopping the engine.

The means for operating the shaft 44 (Figs. I and II) comprises a primary controlling member, preferably a hand wheel A fixed to a shaft 47 provided with a bevel gear 48 meshing with a bevel gear 49 on the shaft 44. In Figs. I, II and III, the parts are shown in the positions they occupy when the engine is running, and from the foregoing description of the pump controlling devices, it will be apparent that the hand wheel A may be turned one-fourth of a revolution with the result of stopping the fuel pumps, and thereby stopping the engine.

To start the engine, the cylinders 2 and 3 (Fig. I) are provided with inlet valve devices B (Fig. XIV) and air under pressure may be admitted through these valve devices for the purpose of actuating the pistons in cylinders 2 and 3. Each valve device B comprises an inlet valve 50 formed on the lower end of a vertical valve stem 51 mounted in a housing 52, through which the starting air is conducted to the valve 50. This valve 50 is automatically opened and closed, as will be presently described, to control the admission of the starting air. The valve stem 51 has an enlarged portion 53 in the form of a piston closely fitted to a cylinder member 54. A piston 55, fixed to the upper end of valve stem 51 (Fig. XIV), lies in a cylinder 56. 57 designates a port through which air under pressure may be conducted to the piston 55 for the purpose of forcing said piston downwardly, thereby opening the inlet valve 50. A restoring spring 58 (Fig. XIV), surrounding the valve stem 51, bears against a collar 59 which engages a washer 60 at the bottom face of the piston 55. This spring 58 is assembled under compression, and it tends to retain the inlet valve 50 in its closed position. The valve 50 may be opened by the admission of compressed air through a port 57 at the top of the valve device, and when this air pressure is reduced, or when the air is vented to the atmosphere, as will be hereinafter described, the spring 58 will return the valve to its closed position. To avoid compression of air under the piston 55 (Fig. XIV), a passageway 61 leads from the space immediately below said piston, and this passageway is in free communication with the atmosphere. 62 designates an oil passageway normally closed by a removable valve 63. The oil admitted to the passageway 62 flows downwardly on the outer face of the cylinder member 54, and to a collar 64 formed directly below an oil port 65 leading to the piston 53.

The means for delivering starting air to the valve devices B includes an air reservoir or flask 66 (Fig. I), provided with a discharge pipe 67 normally closed by a hand operated valve 68, and an air conducting pipe 69 leading from said discharge pipe 67 and provided at its upper end with branches 69′ leading to the inlet valve devices B. The cylindrical member 54 (Fig. XIV) in each of these valve devices is separated from the housing 52 to provide a long inlet passageway 70 for the starting air. The upper end of this inlet passageway 70 is in free communication with the air conducting pipe 69′, and the lower end of said passageway is provided with ports 71 through which the starting air is conducted to a chamber 72 surrounding the valve stem 51. The top wall of this chamber 72 is formed by the piston 53 and the bottom wall is formed by the valve 50. As a consequence the air pressure on the top of valve 50 is normally balanced by the air pressure on the bottom of piston 53, so this air pressure does not tend to open the valve 50.

The means for opening the air inlet valves 50 includes a primary controlling valve, or starting valve 73, (Fig. I) adapted to be opened through the medium of the hand wheel A, as will be presently described, and distributing valve devices E which control the delivery of valve actuating air to the valve devices B. The valve 73 (Figs. I, VI and VIII) is formed on a rod having a relatively small portion 73′ and a larger portion 73ª slidably mounted in the lower portion of the block 9. This block is bored to form an inlet passageway 74 which communicates with the discharge pipe 67 leading from the air reservoir 66. A compression spring 75, located in the inlet passageway 74, bears against the valve 73 and tends to retain said valve in its closed position. The block 9 also has a discharge passageway 76 (Figs. I and VI) leading from the valve 73 to a pipe 77 whereby the air under pressure may be conducted to branches 77′ leading to the lower ends of the distributing valve devices E.

The air passing from the valve 73 does not enter the engine cylinders. It is merely used to open the valves 50 through which the starting air is admitted. 78 designates air conducting pipes (Fig. I) leading from the valve devices E to the inlet ports 57 at the upper ends of the inlet valve devices B. By referring to Fig. XIV, it will be seen that the air under pressure, passing from a pipe 78 and through a port 57, will act upon a piston 55 so as to open an inlet valve 50, and if the pipe 78 is thereafter placed in communication with the atmosphere, the spring 58 will close the inlet valve.

I will now describe the timing means including the air distributing valve devices E which automatically control the delivery of air from the supply pipe 77 (Fig. I) to the pipes 78, and which also enable said pipes 78 to be placed in communication with the atmosphere. Each valve device E (Figs. I, XI and XII) comprises a housing 79 containing a small cylinder 80, the lower end of said cylinder being in constant communication with a branch pipe 77′. A port 81 formed in one side of the small cylinder 80 is in constant communication with the pipe 78, which leads to an inlet device B. A timing valve in the form of a piston 82, mounted in cylinder 80, may be reciprocated with the result of opening and closing communications between the pipes 77' and 78. When the piston valve 82 occupies the position shown in Fig. XII, it closes communication between said pipes so as to prevent the delivery of air from the pipe 77 to the pipe 78. A vent opening 83, formed in valve housing 79, is in constant communication with the open upper end of the small cylinder 80, and when the piston valve 82 is positioned as shown in Fig. XII, with its top face lower than the top of port 81, the pipe 78 is placed in free communication with said vent opening 83.

The piston valve 82 has a stem 84 to which a spring seat 85 is secured, and a spring 86 tends to retain this spring seat in engagement with stop lugs 87, thereby tending to retain the piston valve 82 in the position shown in Fig. XII. A roller 88, at the upper end of stem 84, coöperates with a timing cam 89 fixed to a rotary shaft 90, adapted to be driven by the engine. By referring to Figs. I and XI, it will be seen that there are two cams 89, one for each of the distributing valve devices E. Each cam 89 (Fig. XII) has a long peripheral face 89' concentric with the axis of shaft 90, and a recess 89ª into which the roller 88 may be forced to permit operation of the piston valve 82.

When air under pressure is admitted to the pipe 77 and its branches 77', the air pressure, acting on the bottom faces of piston valves 82, will tend to lift said valves, and when a cam recess 89ª registers with a roller 88, the piston valve 82 below said roller will be lifted by the air pressure, with the result of placing a branch pipe 77' in communication with a pipe 78, at the same time closing communication between said pipe 78 and the vent 83 in valve housing 79. The air pressure transmitted through pipe 78 will then act upon the top of a piston 55 (Fig. XIV) at the upper end of a valve stem 51, so as to open an inlet valve 50, thereby permitting starting air to flow from a branch pipe 69' and into the passageway 70 leading to the open valve 50. Starting air is thus admitted to a cylinder, when an inlet valve 50 is opened by the air pressure transmitted through a pipe 78. At this time the air pressure acting upon the bottom face of piston valve 82 (Fig. XII) overcomes the force of spring 86 and tends to retain the piston valve in an elevated position. As the cam 89 continues its rotary motion, the piston valve 82 is forced downwardly to the position shown in Fig. XII, thereby closing communication between the pipe 77' and the pipe 78, at the same time opening the upper portion of port 81 so as to place the pipe 78 in free communication with the vent 83 in the valve housing 79. The pipe 78 is thus placed in free communication with the atmosphere, so as to reduce the air pressure above the piston 55 (Fig. XIV), thereby permitting the spring 58 to close the inlet valve 50. It should now be understood that the cams 89 can be driven by the engine so as to intermittently open the air actuated inlet valves 50 through which starting air is admitted to the cylinders, and that these cams can be easily timed to provide for the admission of starting air during downward strokes of the engine pistons.

Under normal running conditions, there is no air pressure in the pipe 77 and its branches 77', and the piston valves 82 are not operated in response to movements of the cams 89. Owing to the absence of pressure below the piston valves 82, the springs 86 retain the spring seats 85 in engagement with lugs 87, so as to prevent idle operation of the distributing valve devices E, when the starting mechanism is ineffective.

The delivery of air from the reservoir 66 (Fig. I) to the pipe 77 is controlled by the hand operated valve 68 on the reservoir, and also by the valve 73 in the block 9. Under normal operating conditions, the valve 73 is closed, and the valve 68 is preferably closed to prevent the admission of starting air to the pipe 69 which communicates with the inlet valves 50. It will be understood, however, that the pressure of the starting air on the inlet valves 50 is balanced by a corresponding pressure on the pistons 53 (Fig. XIV) to which said valves are secured, so the starting air does not tend to open the inlet valves 50. To open these valves, compressed air must flow through the pipes 77 and 78, and this valve actuating air is normally shut off by the controlling valve 73, shown in Figs. I and VI.

I have previously suggested that the pipe 77 and its branches 77' (Fig. I) are to be placed in free communication with the atmosphere when the starting device is ineffective, so as to enable the springs 86 to retain the piston valves 82 and their stems 84 in the positions shown by Fig. XII, thereby preventing said piston valves from being idly operated in response to movements of cams 89. To vent the pipe 77 (Figs. I, VI and VIII) a chamber 91, surrounding the valve stem member 73', is connected by means of a vertical passageway 92 to a vent chamber 93 containing a vent valve 94. The stem 94' of the vent valve 94 has longitudinal grooves (Fig. I) through which air may be conducted from the vent chamber 93 to the atmosphere. Under normal operating conditions, when the starting mechanism is ineffective, the vent valve 94 occupies the open position shown in Figs. I and VIII, so as to place the pipe 77 in communication with the atmosphere. 95 designates a spring arranged in the vent chamber 93 and tending to close the vent valve 94.

The manually operating starting device includes means for controlling the valves 73 and 94. 96 designates a vertical controlling shaft (Figs. I, II, VII and VIII), said shaft having at its upper end a bevel gear 97 which meshes with a bevel gear 98 on the horizontal controlling shaft 44. To operate the air controlling valve 73 (Figs. I, VI, VII and VIII), a cam 99 on the vertical shaft 96 coöperates with a lever 100 carrying a screw 101, which engages the outer end of the long valve stem 73$^a$. The vent valve 94 is controlled by a cam 102 fixed to the shaft 96 and coöperating with a lever 103 carrying a screw 101, which engages the outer end of the vent valve stem 94'. When the engine is running, these cams and levers occupy the positions shown in Figs. I, VI, VII, and VIII, the valve 73 being closed to shut off the air supply, and the vent valve 94 being open to vent the pipe 77. I, will hereinafter briefly describe the successive operations performed by turning the hand operated controlling wheel A, and also point out the order in which these operations are performed but for the present the action of the cams 99 and 102 should be given careful consideration. If the vertical cam shaft 96 is turned in the direction indicated by arrows, one-fourth of a revolution from the position shown in Figs. I and VIII, the cams 99 and 102 will not change the positions of the levers 100 and 103, this one-fourth of a revolution being utilized to stop the fuel pumps for the purpose of stopping the engine. However, if the cam shaft is turned one-half of a revolution, the extended portion of cam 102 will pass from the lever 103, thus allowing the spring 95 to close the vent valve 94, and immediately thereafter the extended portion of cam 99 will operatively engage the lever 100, so as to open the air controlling valve 73. When this is done, the compressed air admitted past the valve 73 cannot escape at the vent valve 94, so the air under pressure will be transmitted through the pipe 77 and its branches 77', to the piston valves 82 in the housings 79.

To inject the liquid fuel into the engine cylinders, each injection valve 5 (Fig. I) is provided with a branch pipe 7, which has been previously referred to, and the branches 7 are connected to a main air supply pipe 105. An injection air flask or reservoir 106 (Fig. I) is provided with a discharge pipe 107 leading to the inlet port 108 of a valve housing 110 in the block 9. The pipe 105 leads from the discharge port 109 of this valve housing. An injection air controlling valve F, located in the housing 110, comprises a valve member 112 in the form of a piston, and a beveled valve member 113 adapted to engage a corresponding seat in the valve housing. This valve has a projecting end 114 adapted to be engaged by a cam 115 on the manually operated shaft 96. A compression spring 116 (Figs. I, VIII and IX) tends to retain the injection air valve device F in the position shown by Fig. IX, wherein the piston valve member 112 closes communication between the inlet port 108 and the outlet port 109, thereby closing communication between the supply pipe 107 and the delivery pipe 105.

When the engine is running the pressure of the injection air, acting on the piston valve member 112, retains said valve in the open position shown in Figs. I and VII, and the injection air passes freely through the valve housing 110. At this time, the valve 117 (Fig. I) on the injection air reservoir 106 is open, and a vent valve 118 above the valve 117 is closed, to prevent the injection air from escaping to the atmosphere.

When the engine is still it is customary to close the injection air valve 117 (Fig. I), and the vent valve 118 may then be opened to release the compressed air in pipes 107 and 105. The spring 116 will then be permitted to move the valve device F to the position shown in Fig. IX, wherein the piston valve member 112 closes communication between the ports 108 and 109 of the valve housing 110. When the valve device F occupies the last mentioned position (Fig. IX), the pipe 105 is placed in free communication with the atmosphere. Note that the compressed air in pipe 105 can then flow past the right hand end of piston valve 112, and thence along a relatively small portion of the valve device F to a vent opening 119.

The injection air controlling valve F is primarily intended to prevent the injection air from prematurely starting the engine, and to accomplish this it prevents premature flow of air to the injection valves on the cylinders which receive the starting air. This function of the valve F will be hereafter described more fully. The cam 115 (Figs. I, VII and VIII), associated with the valve device F, is loosely mounted on the hand operated shaft 96 and it is yieldingly connected to said shaft by means of a torsional spring 120. Fig. VII shows that one end of spring 120 is fixed to the hub of cam 115, while the opposite end is fixed to the hub of cams 99 and 102, the last mentioned hub being rigidly secured to shaft 96. A lug 121, depending from the hub of cam 115, lies in a recess 122 formed in the top of the adjacent hub, which carries the cams 99 and 102. The spring 120 is under tension and it yieldingly holds the lug 121 in engagement with one of the end walls of the elongated recess 122, as shown in Fig. VII. The cam 115 will therefore turn with the shaft 96, but when said cam engages the projecting end 114 of the valve device F (Fig. X), the shaft 96 may be turned a slight distance without transmitting movement to the cam 115. The continued motion of shaft 96 is comparatively slight, but it increases the tension of the spring 120 which yieldingly connects the cam to the shaft, and thereafter, if the valve device F is displaced to the position shown by dotted lines in Fig. X, the spring 120 will be permitted to shift the cam 115 to the position shown by dotted lines (Fig. X), wherein it will retain the valve device F in the position shown by full lines in Fig. IX. The pressure of the injection air normally retains the valve device F in the position shown by full lines in Figs. VII and X, but if this pressure is shut off by closing the valve 117 (Fig. I) at the injection air reservoir 106, and thereafter opening the vent valve 118, the spring 116 will move the valve device F to the position shown in Fig. IX.
The running conditions may be briefly described as follows:

The hand wheel A occupies the position shown by Figs. I and II. The four fuel pumps are operated to deliver fuel to the injection valves 5 on the four engine cylinders. The injection air controlling valve F is open, as shown in Fig. I, to provide for the delivery of injection air to all of the cylinders. The air controlling valve 73 (lower portion of Fig. I) is closed to prevent the delivery of air to the distributing valve devices E, which control the movements of the starting valves 50. The vent valve 94 (Figs. I and VIII) is open to place the air pipe 77 in free communication with the atmosphere.

*Stopping the engine.*

One-fourth of a revolution of the hand operated wheel A (Fig. I) will impart a corresponding movement to the shaft 44 on which the pump controlling cams 42 and 43 are mounted, and this movement of shaft 44 will cause the abrupt shoulders 45 on said cams (Figs. III, IV and V) to engage corresponding shoulders 46 on the cams 32, with the result of displacing said cams 32 so as to locate all of the connecting members 27 in idle positions wherein they cannot transmit movement to the pump plungers 8. In this manner all of the fuel pumps are stopped for the purpose of stopping the engine.

The one-fourth of a revolution of the hand wheel A, which results in stopping the fuel pumps, will also impart one-fourth of a revolution to the vertical shaft 96 (Figs. I, VII and X), and the cam 115 will be displaced from the position shown in Fig. VII to the position shown by full lines in Fig. X. The cam 115 is stopped by engaging the extended end 114 of the valve device F, and the spring connecting said cam to its shaft permits the shaft to continue in motion for a fraction of a revolution without actuating the cam 115. The valve 117 at the injection air reservoir 106 (Fig. I) is then closed, and the vent valve 118 is opened to permit the escape of compressed air from the pipe 107. Owing to the reduction of the air pressure at the injection air controlling device F, the spring 116 will move said valve device to the position shown by Fig. IX, wherein the piston valve member 112 closes communication between the injection air reservoir and the delivery pipe 105. At this time the compressed air in pipe 105 is permitted to pass the right hand end of piston valve 112 and to escape through the vent opening 119. It is important to observe that when the spring 116 displaces the valve device F to the position shown by full lines in Fig. IX, the projecting end 114 of said valve device will be displaced from the path of the yieldingly mounted cam 115, and the spring 120 associated with said cam will immediately shift the cam to the position shown by full lines in Fig. IX and by dotted lines in Fig. X. The cam 115 will then retain the injection air controlling valve F in the position shown by Fig. IX, so as to positively prevent the delivery of injection air to the engine cylinders.

*Starting the engine.*

1st. The crank shaft of the engine is usually turned a slight distance to locate the piston of cylinder 2 or 3 in a position where it will be operated by the starting air. To provide for the delivery of air from the reservoirs 66 and 106 (Fig. I), the vent valve 118 is closed and the valves 117 and 68 are opened. At this time the injection air passing from reservoir 106 cannot escape past the valve device F for the reason that the cam 115 retains said valve device in the position shown by full lines in Fig. IX, and by dotted lines in Fig. X, the object being to prevent premature delivery of injection air to the cylinders which are to receive the starting air. Merely opening the valve 68 (lower portion of Fig. I) does not result in the delivery of starting air to the cylinders, for the air pressure transmitted through pipe 69 does not tend to open the starting valves, and the air pressure transmitted through pipe 67 (lower portion of Fig. I) merely acts upon a closed valve 73. The hand operated controlling wheel A must be turned to start the engine. If this wheel is turned one-fourth of a revolution (one-half of a revolution from the position shown in the drawings), the projecting portion of cam 102 will pass from the lever 103 (Figs. I and VIII) so as to permit the spring 95 to close the vent valve 94; and the projecting portion of cam 99 will engage the lever

100 to open the valve 73, thereby admitting air to the pipe 77 leading to the distributing valve devices E, and the cam 115 will pass from the valve device F to permit said valve to be opened by the pressure of the injection air. This one-fourth revolution of the hand wheel and controlling shafts 44 and 96 locates the pump controlling cams 42—43 in positions one-half of a revolution from the positions shown by Figs. III, IV and V. Therefore, the initial movement of the hand wheel does not release the cams 42 and 43 from the shoulders 46 on the cams 32, so the starting air is admitted to cylinders 2 and 3 without connecting the pump plungers to their operating mechanism, the object being to start the engine by air pressure without admitting fuel to any of the cylinders. The air pressure transmitted through pipe 77 and its branches 77' is delivered to the distributing valve devices E containing the cam controlled piston valves 82, which control the delivery of air through the pipes 78. It may be remembered that this air is used to open the starting valves 50 (Figs. I and XIV) so as to properly admit the starting air which passes through the branch pipe 69'.

2nd. While the engine is driven by starting air admitted to cylinders 2 and 3, another one-fourth revolution of the hand wheel A and its driven shafts 44 and 96 (three-fourths of a revolution from the positions shown by Figs. I, II, III, IV, V and VIII) will result in the delivery of fuel to the cylinders 1 and 4, which do not receive the starting air. This is accomplished by movements of the cams 43 which pass from the cams 32 controlling the tripping devices 27 of the two fuel pumps associated with cylinders 1 and 4. Each cam 43, shown in Figs. II, III and V, has an inclined face 43' located almost diametrically opposite its abrupt shoulder 45, while each cam 42 has a similar inclined face 42' located closer to its shoulder 45, the projecting rib of each cam 43 being equal in length to about one-half of a circle, while the corresponding rib of cam 42 is equal to about three-fourths of a circle. Owing to the manner in which the cams 42 and 43 act upon the pump controlling cams 32, the last mentioned movement of cam shaft 44 will release the cams 43 from their companion cams 32, but the peripheral faces of cams 42 will continue to engage the shoulders 46 on their companion cams 32. Two of the pump plungers 8 will therefore be connected to their operating mechanism for the purpose of pumping fuel to the cylinders which do not receive the starting air. As the engine continues to operate by the delivery of compressed air to the cylinders 2 and 3, firing begins in the cylinders 1 and 4, and the engine is then driven partly by the combustion of fuel in cylinders 1 and 4 and partly by the compressed air in cylinders 2 and 3.

3rd. Another one-fourth of a revolution of the hand actuated controlling shafts 44 and 96 will establish the ordinary running conditions, and this final movement will restore the various hand operated cams, etc., to the positions shown by Figs. I to VIII, inclusive. This movement will displace the projecting portion of the cam 99 from the lever 100, thereby permitting spring 75 to close the valve 73. It will also engage the projecting portion of cam 102 with the lever 103 to open the vent valve 94, thereby venting the air pipe 77, and finally the pump controlling cams 42 will pass from shoulders 46 on their companion cams 32 so as to permit operation of the pump plungers associated therewith. The delivery of starting air is discontinued by the closing of valve 73, and all of the fuel pumps are operated to deliver the liquid fuel to all of the cylinders in the usual manner.

I claim:

1. An internal combustion engine provided with a fuel inlet, an injection air valve adapted to control the delivery of injection air to said fuel inlet, a starting air valve controlling the delivery of starting air to the engine, a manually operable device controlling said starting air valve, a spring tending to close said injection air valve, said injection air valve being movable to its open position in response to the pressure of the injection air, a manually operable device whereby said injection air valve is positively retained in its closed position to prevent premature delivery of injection air to the engine, and a manually operated controlling member common to both of said manually operable devices.

2. An internal combustion engine provided with a fuel inlet, an injection air valve adapted to control the delivery of injection air to said fuel inlet, a starting air valve controlling the delivery of starting air to the engine, a manually operable device controlling said starting air valve, a spring tending to close said injection air valve, said injection air valve being movable to its open position in response to the pressure of the injection air, a vent valve in the injection air line operable to relieve the air pressure at said injection air valve, thereby permitting said spring to close the injection air valve, a manually operable device whereby said injection air valve is positively retained in its closed position to prevent premature delivery of injection air to the engine, and a manually operated controlling member common to both of said manually operable devices.

3. An internal combustion engine provided with a fuel inlet, an injection air valve adapted to control the delivery of injection air to said fuel inlet, a starting air valve controlling the delivery of starting air to the engine, a manually operable device controlling said starting air valve, a manually operable device controlling said injection air valve to prevent premature admission of injection air to the engine, an operating member common to both of said manually operable devices, and means whereby movement is transmitted from said operating member to said manually operable devices, said means including a yielding transmission member through which movement is yieldingly transmitted to the device controlling the injection air valve.

4. An internal combustion engine provided with a fuel inlet, an injection air valve adapted to control the delivery of injection air to said fuel inlet, a starting air valve controlling the delivery of starting air to the engine, a manually operable device controlling said starting air valve, a spring tending to close said injection air valve, said injection air valve being movable to its open position in response to pressure of the injection air, a vent valve in the injection air line operable to relieve the pressure at said injection air valve, thereby permitting said spring to close the injection air valve, a manually operable device comprising a cam whereby said injection air valve is positively retained in its closed position to prevent premature delivery of injection air to the engine, a manually operated controlling member common to both of said manually operable devices, and means whereby movement is transmitted from said controlling member to both of said manually operable devices, said means including a spring through which movement is yieldingly transmitted to said cam.

5. An internal combustion engine provided with a fuel inlet, a fuel pump whereby fuel is delivered to said fuel inlet, an injection air valve controlling the delivery of injection air to said fuel inlet, a starting air valve controlling the delivery of starting air to the engine, and a manually operated controlling member common to said fuel pump, injection air valve and starting air valve.

6. An internal combustion engine provided with a fuel inlet, a fuel pump whereby fuel is delivered to said fuel inlet, a manually operable device whereby said fuel pump is rendered ineffective to prevent the delivery of fuel to the engine, an injection air valve controlling the delivery of injection air to said fuel inlet, a manually operable device controlling said injection air valve to prevent premature admission of injection air to the engine, a starting air valve controlling the delivery of starting air to the engine, a manually operable device controlling said starting air valve, and an operating member common to all of said manually operable devices.

7. An internal combustion engine provided with a fuel inlet, a fuel pump whereby fuel is delivered to said fuel inlet, a manually operable device whereby said fuel pump is rendered ineffective to prevent the delivery of fuel to the engine, an injection air valve controlling the delivery of injection air to said fuel inlet, a manually operable device controlling said injection air valve to prevent premature admission of injection air to the engine, a starting air valve controlling the delivery of starting air to the engine, a manually operable device controlling said starting air valve, a rotary controlling member, and means whereby movement is transmitted from said rotary controlling member to all of said manually operable devices, so as to stop and start the engine.

8. An internal combustion engine provided with a fuel inlet, a fuel pump whereby fuel is delivered to said inlet, a manually operable rotary cam whereby said fuel pump is rendered ineffective to prevent the delivery of fuel to the engine, a starting air valve controlling the delivery of starting air to the engine, a manually operable rotary cam controlling said starting air valve, an injection air valve controlling the delivery of injection air to said fuel inlet, a manually operable rotary cam controlling said injection air valve to prevent premature admission of injection air to the engine, a rotary controlling member movable to stop and start the engine, and means whereby rotary movement is transmitted from said rotary controlling member to all of said rotary cams.

9. An internal combustion engine having a plurality of cylinders each provided with a fuel inlet, an individual fuel pump for each cylinder whereby fuel is pumped to the fuel inlets, means for conducting injection air to said fuel inlets, two of said cylinders being provided with inlet valves for the admission of starting air in starting the engine, an injection air valve controlling the delivery of injection air to the last mentioned cylinders, a starting air valve controlling the delivery of starting air to said inlet valves, and a manually operated controlling member common to said fuel pumps, injection air valve and starting air valve.

10. An internal combustion engine having an inlet for the admission of compressed air in starting the engine, an inlet valve controlling said inlet, an air conductor through which air is conducted to said valve, a starting air valve controlling the admission of air to said air conductor, said conductor having a vent opening for the escape of air at a point between said starting air valve and the inlet valve, a vent valve arranged to open and close said vent opening, and a manually operated controlling member common to said vent valve and starting air valve.

11. An internal combustion engine having an inlet for the admission of compressed air in starting the engine, an inlet valve controlling said inlet, an air conductor through which air is conducted to said valve, a starting air valve controlling the admission of air to said air conductor, said conductor having a vent opening for the escape of air at a point between said starting air valve and the inlet valve, a vent valve arranged to open and close said vent opening, a cam controlling said starting air valve, a cam controlling said vent valve, and a manually operated controlling member common to both of said cams.

12. An internal combustion engine having an inlet for the admission of compressed air in starting the engine, an inlet valve adapted to open and close said inlet, an air conductor through which air is conducted to said inlet valve, a controlling valve in said air conductor adapted to control the delivery of air to said inlet valve, a starting air valve controlling the delivery of air to said air conductor, said air conductor having a vent opening for the escape of air at a point between said starting air valve and said controlling valve, a vent valve arranged to open and close said vent opening, and a manually operated controlling member common to said vent valve and starting air valve.

13. An internal combustion engine having an inlet for the admission of compressed air in starting the engine, an air actuated inlet valve adapted to open and close said inlet, an air conductor through which the actuating air is conducted to said air actuated inlet valve, a controlling valve device in said air conductor adapted to control the delivery of actuating air to said inlet valve, a rotary cam for operating said controlling valve device, a spring tending to disengage said controlling valve device from said cam, said valve device being movable into engagement with the cam in response to the pressure of said actuating air, a starting air valve controlling the delivery of actuating air to said air conductor, said air conductor having a vent opening for the escape of air at a point between said starting air valve and said controlling valve device, a vent valve arranged to open and close said vent opening, and a manually operated controlling member common to said vent valve and starting air valve.

14. An internal combustion engine having an inlet for the admission of compressed air in starting the engine, a balanced inlet valve adapted to open and close said inlet, means for conducting compressed air to said balanced inlet valve so as to place its balancing members under pressure, a spring tending to retain said balanced inlet valve in its closed position, said balanced inlet valve having a piston member, an air conductor through which valve actuating air is conducted to said piston member to open the inlet valve, a controlling valve device in said air conductor adapted to control the delivery of actuating air to said piston member, said controlling valve device having a valve controlled vent permitting the escape of air from said piston member, a rotary cam controlling the movements of said controlling valve device, a starting valve controlling the delivery of air to said air conductor, and a manually operated starting device controlling said starting valve.

15. An internal combustion engine provided with a fuel inlet, a fuel pump for the delivery of fuel to said inlet, an injection air valve adapted to control the delivery of injection air through said inlet so as to prevent premature admission of injection air to the engine, and a manually operated controlling member common to said injection air valve and fuel pump.

16. An internal combustion engine provided with a fuel inlet, a fuel pump for the delivery of fuel to said fuel inlet, operating means for said pump, an injection air valve device adapted to control the delivery of injection air through said fuel inlet so as to prevent premature admission of injection air to the engine, a starting air valve device controlling the delivery of starting air to the engine, and a manually operated controlling member common to said pump operating means and valve devices.

17. An internal combustion engine having a fuel inlet and an air inlet for the admission of compressed air in starting the engine, a fuel pump for the delivery of fuel to said fuel inlet, an air actuated inlet valve device controlling the admission of compressed air through said air inlet, an air conductor for the delivery of valve actuating air to said inlet valve device, a timing device controlling the delivery of actuating air to said inlet valve, and a manually operated controlling member common to said fuel pump and timing device.

18. An internal combustion engine having a fuel inlet and an air inlet for the admission of compressed air in starting the engine, a fuel pump for the delivery of fuel to said fuel inlet, an air actuated inlet valve device controlling the admission of compressed air through said air inlet, an air conductor for the delivery of valve actuating air to said inlet valve device, a timing device including a valve arranged in said conductor and driven by the engine to control the delivery of valve actuating air to said inlet valve, and a manually operated controlling member common to said fuel pump and timing device.

19. An internal combustion engine having a fuel inlet and an air inlet for the admission of compressed air in starting the engine, a fuel pump for the delivery of fuel to said fuel inlet, an air actuated inlet valve device controlling the admission of compressed air through said air inlet, an air conductor for the delivery of valve actuating air to said inlet valve device, a timing device including an air actuated timing valve arranged in said air conductor, said air actuated timing valve being movable in response to movements of the engine so as to control the delivery of actuating air to said air actuated inlet valve device, a starting valve controlling the delivery of valve actuating air to said air conductor, and a manually operated controlling member common to said starting valve and fuel pump.

20. An internal combustion engine having a fuel inlet and an air inlet for the admission of compressed air in starting the engine, a fuel pump for the delivery of fuel to said fuel inlet, an air actuated inlet valve device controlling the admission of compressed air through said air inlet, an air conductor for the delivery of valve actuating air to said inlet valve device, a spring tending to retain said inlet valve device in its closed position, a timing device including an air actuated timing valve in said air conductor, a spring tending to retain said timing valve in its closed position, said timing valve being movable to its open position in response to the pressure of the actuating air, means driven by the engine to control the movements of said timing valve, a starting valve controlling the delivery of valve actuating air to said air conductor, and a manually operated controlling member common to said starting valve and fuel pump.

21. An internal combustion engine having a fuel inlet and an air inlet for the admission of compressed air in starting the engine, a fuel pump for the delivery of fuel to said fuel inlet, an air actuated inlet valve controlling the delivery of compressed air through said air inlet, a spring tending to retain said inlet valve in its closed position, an air conductor for the delivery of valve actuating air to said inlet valve, a timing device including a timing valve arranged in said air conductor to control the delivery of actuating air to said inlet valve, said conductor having a vent adapted to be opened and closed by said timing valve, a starting valve controlling the delivery of valve actuating air to said conductor, and a manually operated controlling valve common to said starting valve and fuel pump.

22. An internal combustion engine having a plurality of cylinders each provided with a fuel inlet, an individual fuel pump for each cylinder whereby fuel is delivered to the fuel inlets, two of said cylinders being provided with air actuated inlet valves for the admission of starting air in starting the engine, air conductors whereby valve actuating air is delivered to said inlet valves, distributing valve devices arranged in said air conductors to control the delivery of the valve actuating air to said inlet valves, each of said distributing valve devices including a timing valve adapted to open and close the air conductor in which it is mounted, said timing valves being movable to their open positions in response to the pressure of the valve actuating air, cams driven by the engine to control the movements of said timing valves, valve-closing springs tending to release said timing valves from said cams, a starting valve controlling the delivery of valve actuating air to said timing valves, and a manually operated controlling member common to said fuel pumps and starting valve.

23. An internal combustion engine having an air inlet for compressed air in starting the engine, an air actuated inlet valve device controlling the admission of compressed air through said inlet, an air conductor for the delivery of valve actuating air to said inlet valve device, a timing device including a timing valve arranged in said air conductor to control the delivery of valve actuating air, and a cam driven by the engine and acting upon said timing valve to control the movements thereof, said timing valve being movable into operative engagement with said cam in response to the pressure of the valve actuating air, and a manually operated starting valve controlling the delivery of valve actuating air to said timing valve.

24. An internal combustion engine having an air inlet for compressed air in starting the engine, an air actuated inlet valve device controlling the admission of compressed air through said inlet, an air conductor for the delivery of valve actuating air to said inlet valve device, a timing device including a timing valve arranged in said air conductor to control the delivery of valve actuating air, a spring tending to close said timing valve, said timing valve being movable to its open position in response to the pressure of the valve actuating air, and a cam driven by the engine and acting upon said timing valve to control the movements thereof, said spring being adapted to release said timing valve from said cam, and a manually operated starting valve controlling the delivery of compressed air to said conductor.

In testimony that I claim the foregoing I hereunto affix my signature.

REINHARD HILDEBRAND.